Figure 1:
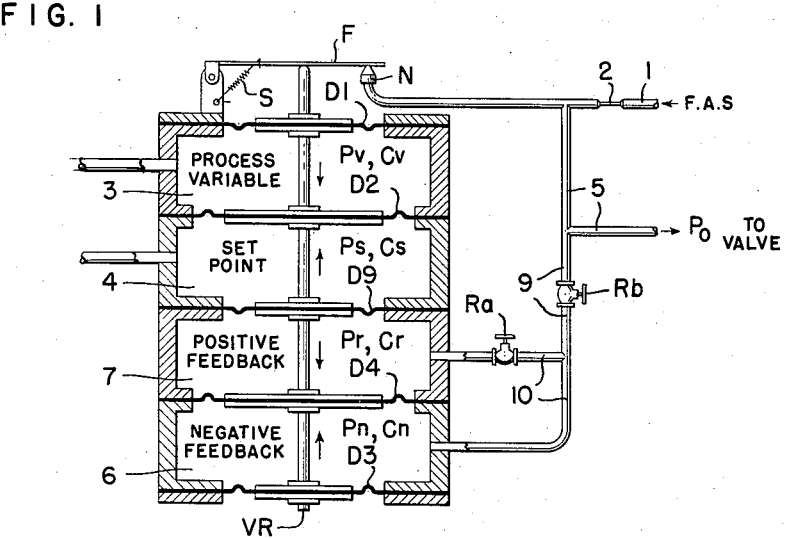

June 2, 1959  E. C. GROGAN  2,888,941
AIR-PRESSURE-OPERATED PROPORTIONAL BAND ADJUSTMENT
Filed Dec. 13, 1952  4 Sheets-Sheet 1

INVENTOR.
EDWARD C. GROGAN
BY
ATTORNEY.

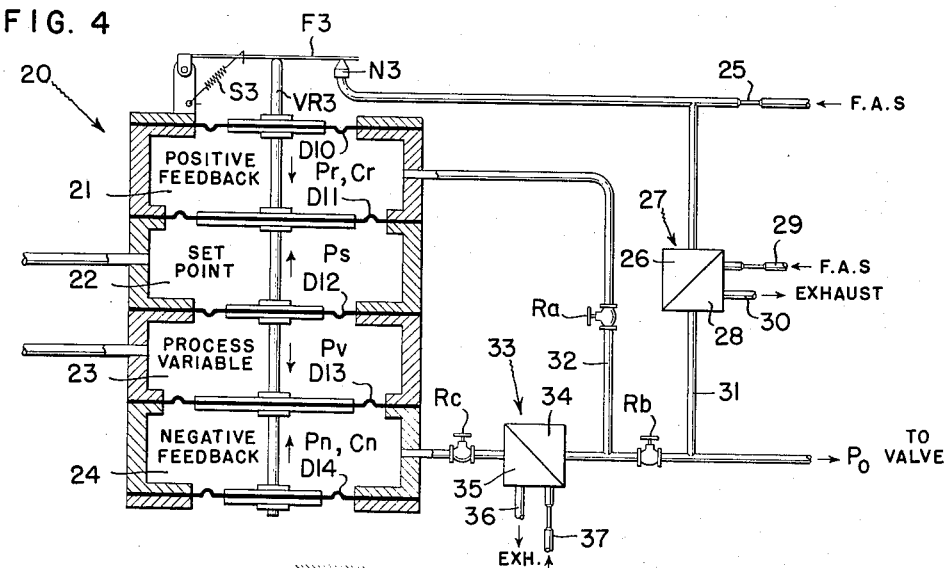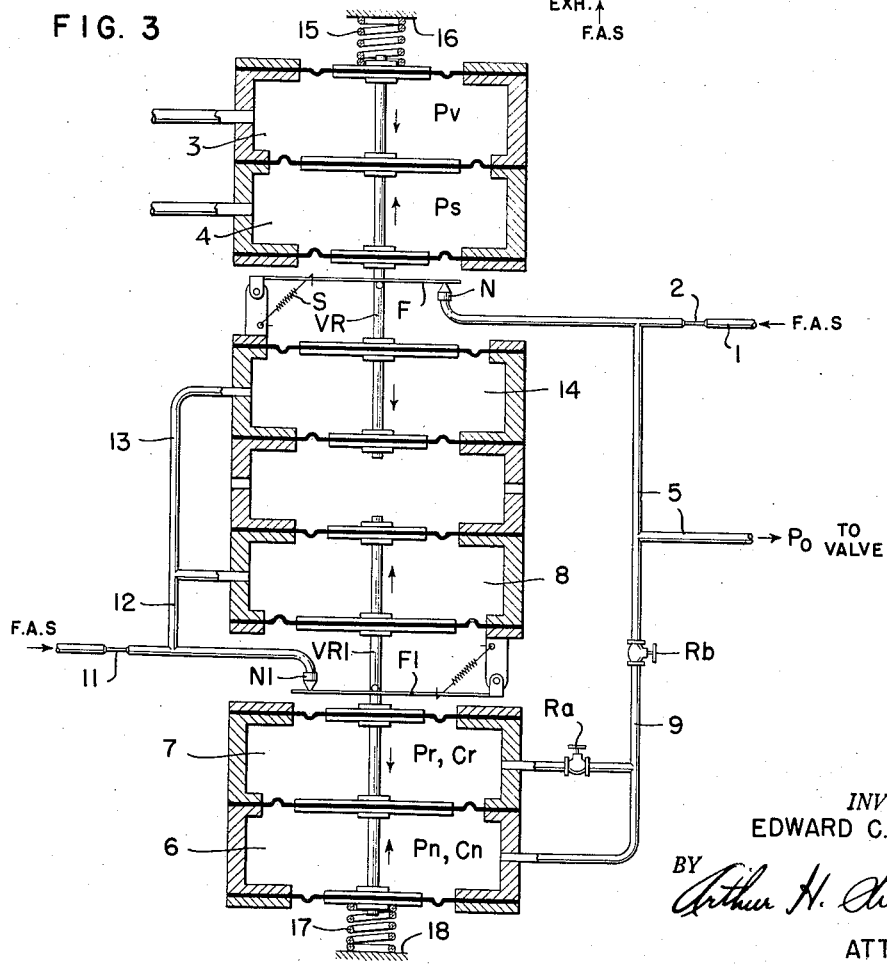

June 2, 1959   E. C. GROGAN   2,888,941
AIR-PRESSURE-OPERATED PROPORTIONAL BAND ADJUSTMENT
Filed Dec. 13, 1952   4 Sheets-Sheet 3

INVENTOR.
EDWARD C. GROGAN
BY
ATTORNEY.

June 2, 1959 E. C. GROGAN 2,888,941
AIR-PRESSURE-OPERATED PROPORTIONAL BAND ADJUSTMENT
Filed Dec. 13, 1952 4 Sheets-Sheet 4
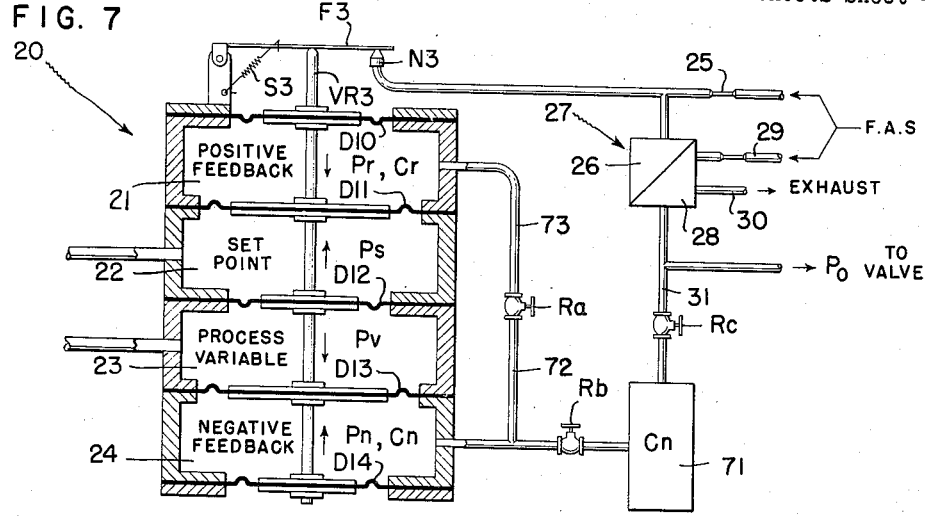
*INVENTOR.*
EDWARD C. GROGAN
BY
ATTORNEY.

United States Patent Office 2,888,941
Patented June 2, 1959

2,888,941

AIR-PRESSURE-OPERATED PROPORTIONAL BAND ADJUSTMENT

Edward C. Grogan, Philadelphia, Pa., assignor to Minneapolis-Honeywell Regulator Company, Minneapolis, Minn., a corporation of Delaware Application December 13, 1952, Serial No. 325,859

12 Claims. (Cl. 137—86)

This invention relates to an industrial process controller operated by an elastic fluid, such as air. This controller has several different modes of operation including proportional-position action, proportional-speed floating action, and rate action. This controller also has air-operated means for adjusting the proportional band. These terms are defined in the publication Mechanical Engineering for February 1946, republished by the American Society of Mechanical Engineers, 29 W. 39th Street, New York 18, New York in a pamphlet entitled "Automatic Control Terms." A copy of this pamphlet is in the United States Patent Office.

It is an object of this invention to provide improvements in a controller having proportional plus reset plus rate action plus adjustable proportional band. This controller has means for adjusting each of these actions.

It is an additional object to provide means for adjusting each of these actions through the medium of adjusting a restriction to elastic fluid flow through a conduit which conducts a control-exercising, elastic fluid.

A further object is to provide such a controller in which adjustment of one action or mode of operation will not adversely affect another.

Still another object is to provide such a controller wherein the adjustment of one restriction affects two or more of the actions or modes of operation of the controller concordantly in the manner in which they should be adjusted, i.e., adjustment of one action or mode of operation often requires adjustment of another in a certain way.

One more object is to obtain adjustment of the throttling range without upsetting the process under control by conducting the difference in pressure due to the change in the measured variable to a pressure which can be varied under the control of the operator of the process.

It is a further object of this invention to provide a controller in which the controlled elastic fluid is fed back to the controller through a restriction to a negative feedback motor and through a further, series-connected restriction to a positive feedback motor in such a way that the proportional band can be adjusted by varying one or other of said restrictions.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Each of the eight figures labelled Figs. 1–8 is a schematic or diagrammatic representation in longitudinal cross section of an elastic-fluid-operated controller and its cooperating valves and piping.

Each chamber is labelled with the pressure it contains. These pressures are: Positive Feedback, Set Point, Process Variable, and Negative Feedback. Each chamber is also labelled with a symbol denoting the pressure in that chamber or the capacity of that chamber. These symbols for pressure are: $Pr$, $Ps$, $Pv$, and $Pn$. These symbols for capacity are $Cr$ and $Cn$. The arrows in each chamber denote the direction in which the pressure in that chamber acts.

In Fig. 1, there is shown an elastic-fluid-operated controller comprising a source of fluid, such as air, under suitable pressure. This source is indicated as a filtered air supply F.A.S. From this source a pipe 1 leads through a supply restriction 2 to a nozzle N controlled by a flapper F. Flapper F is biased by spring S toward engagement with nozzle N. The controller comprises a casing made up of a plurality of rings and divided by flexible diaphragms into four compartments. Diaphragms D1, D3, and D9 are relatively small and form sealing diaphragms. Diaphragms D2 and D4 are larger and form the operating wall of the chambers of which they are a part. Each of the diaphragms D1—D4 and D9 is attached at its circumference to the casing and is attached at its flexible center to a valve rod VR. Chamber 3 is adapted to receive a pressure $Pv$ proportional to the instantaneous value of the measured or process variable or that variable of the process under control to which it is desired to have the controller respond. Such a variable may be pressure, temperature, or any other variable for which a suitable measuring element exists. The measuring element converts the instantaneous value of the measured or process variable into a variable fluid pressure $Pv$ which is fed to the process variable chamber 3.

Chamber 4 is adapted to receive a pressure $Ps$ which is proportional to the set point or that value of the process variable which it is desired to have the controller maintain. The pressures $Pv$ and $Ps$ act on diaphragm D2 in opposite directions as shown by the arrows in these chambers.

If the pressure $Pv$ varies from the desired or set point pressure $Ps$, flapper F is moved relative to nozzle N and causes output pressure $P_0$ to vary and flow through pipe 5 and thereby move a second controller (not shown) or a final control element (not shown) to a new position. At the same time, the change in pressure $P_0$ starts a flow of elastic fluid through restriction $Rb$ to or from chamber 6. Restriction $Rb$, such as a needle valve, may be manually adjustable and controls the flow of air to chamber 6 through a conduit 9 connected to pipe 5 and conduit 10. A second, manually adjustable restriction $Ra$, such as a needle valve, controls the flow of fluid through conduit 10, which connects the negative feedback chamber 6 to the positive feedback chamber 7. Upon a change in pressure $P_0$, the flow of elastic fluid through restriction $Rb$ to or from the negative feedback chamber 6 provides a negative feedback pressure $Pn$. At the same time, this change in the negative feedback pressure $Pn$ starts a flow of elastic fluid through restriction $Ra$ to or from the positive feedback chamber 7. The pressures $Pn$ and $Pr$ act on the valve rod VR in opposite directions so that, if the pressure $Pn$ varies from the pressure $Pr$, the flapper F is moved relative to the nozzle N and varies the pressure of the air from the source F.A.S. through the nozzle restriction 2. The restriction $Ra$ delays the equalization of the pressures $Pn$ and $Pr$ so that changes in pressure $Pr$ lag in time behind the changes in pressure $Pn$. Therefore, the effect of changes in pressure $Pn$ predominate temporarily. The pressure of source F.A.S. may conveniently be of the order of 15 pounds per square inch.

If the restriction $Rb$ is closed, changes in the output pressure $P_0$ cause no reaction by the controller so that, when a deviation from the set point pressure $Ps$ occurs in the process variable pressure $Pv$, the controller operates with an on-off action and causes the final control element to move to one or the other limit of its travel.

If the restriction $Rb$ is completely open and the restriction $Ra$ is completely closed, changes in output pressure $P_o$ are transmitted immediately to the negative feedback chamber so that pressure $Pn$ always equals $P_o$. This causes the controller to operate so that pressure $P_o$ varies linearly with respect to $Pv$, the ratio being the minimum obtainable with the device as designed.

If the restriction $Rb$ is open a greater or lesser amount and the restriction $Ra$ is closed, a greater or lesser amount of negative feedback pressure $Pn$ is fed back to the controller so that the controller operates with a rate component superimposed upon the same minimum proportionality.

If both the restrictions $Rb$ and $Ra$ are open a greater or lesser amount, both negative feedback pressure $Pn$ and positive feedback pressure $Pr$ are caused to vary, thereby varying their effects upon the controller so that the controller operates with a proportional plus rate plus reset plus adjustment of proportional band mode of operation. These modes of operation are adjustable by suitable adjustments of the restrictions $Ra$ and $Rb$.

The controller represented in Fig. 1 embodies means for obtaining in combination the three fundamental modes of controller operation and for adjusting the magnitudes and the relations between these modes as may be required for the application of the controller to the control of different processes. These three modes are proportional-position action, proportional-speed floating action, and rate action.

The proportional-position action is produced by variations in pressure $Pn$ in the negative feedback chamber resulting from the changes in the output pressure $P_o$ that are caused by fluctuations in the process variable pressure $Pv$. The rate action is produced by the time delay involved in changing pressure $Pn$ responsive to changes in $P_o$, this being the time needed to change the quantity of fluid contained in the negative feedback chamber through restrictions $Rb$ and $Ra$. The proportional-speed floating action is the result of the gradual equalization of pressures $Pn$ and $Pr$ in the negative feedback chamber and the positive feedback chamber, respectively. The rate at which this action takes place is controlled by the volumes $Cn$ and $Cr$ of the chambers in combination with the resistances in the restrictions $Ra$ and $Rb$.

When the negative feedback chamber volume $Cn$ is relatively small with respect to the volume $Cr$ of the positive feedback chamber (including that of an extra volume chamber if necessary) a change in pressure $P_o$ can be made to produce a relatively smaller change in the pressure $Pn$ resulting from the pressure-dividing action of the two restrictions $Ra$ and $Rb$. The degree to which change in $Pn$ is smaller than $P_o$ is adjustable by varying the relative resistances of restrictions $Ra$ and $Rb$. Adjusting the ratio of $Ra$ to $Rb$ thus provides the desired adjustability of the proportional-position action. A ratio of $Cn$ to $Cr$ of about 1 to 10 is suitable for proportional-position adjustment.

Rate adjustment is varied by adjusting the parallel resistance value $$\frac{RaRb}{Ra+Rb}$$

of the two restrictions. Adjustment of the rate of the proportional-speed floating action is dependent principally upon the volume $Cr$ and the sum $Ra+Rb$ of the resistances of the restrictions, so that, by adjustment of the sum of the resistances $Ra$ and $Rb$, the desired adjustment can be effected in the proportional-speed floating action.

Figure 2:
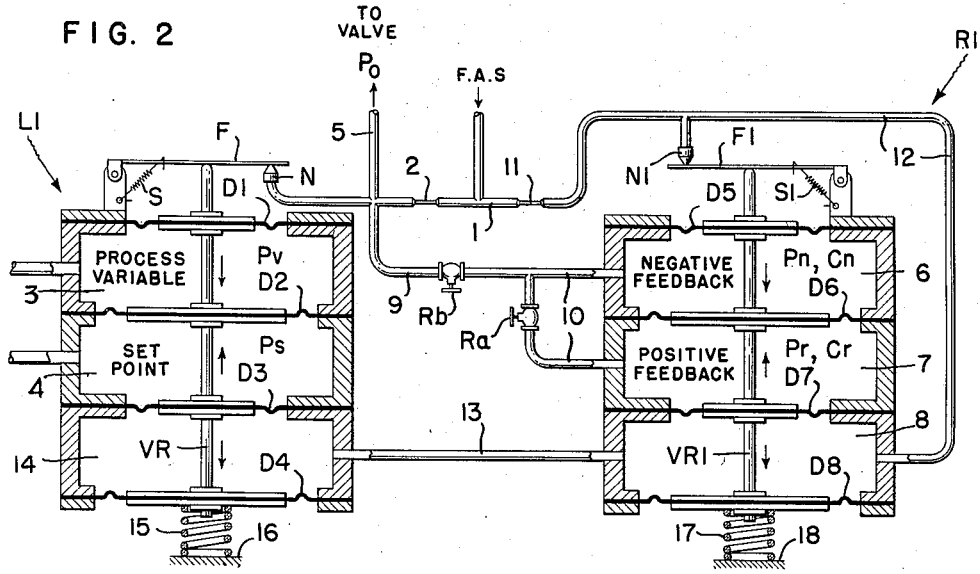

Fig. 2 shows a modification similar to that of Fig. 1 but having two controller stacks or sections. The left controller stack or section is generally indicated at L1. Section L1 comprises a casing made up of a plurality of rings and divided by flexible diaphragms D1, D2, D3, and D4 into three compartments. Diaphragms D1 and D3 are relatively small and form sealing diaphragms. Diaphragms D2 and D4 are larger and each forms the operating wall of the chamber of which it is a part. Each of the diaphragms D1—D4 is attached at its circumference to the casing and is attached at its central, flexible portion to valve rod VR. The second controller stack or section R1 shown on the right of Fig. 2 is similar to the section L1 containing chambers 3 and 4. This second controller stack R1 comprises a casing containing a plurality of chambers 6, 7, and 8. Diaphragms D5 and D7 are smaller, sealing diaphragms while diaphragms D6 and D8 are larger diaphragms and each forms the movable or motor wall of the chamber of which this diaphragm is a part. Each of the diaphrams is fixed at its circumference in the casing and is attached at its central, movable portion to a valve rod VR1 adapted to move a flapper F1 relative to a nozzle N1.

Air from source F.A.S. passes through restriction 11 to nozzle N1 and thence is led through pipe 12 to chamber 8 where it acts on diaphragm D8 in the direction shown by the arrow so as to reenforce the pressure $Pn$ and to oppose the pressure $Pr$. The pressure from chamber 8 is also fed through pipe 13 to chamber 14 in the first controller section L1. The pressure in chamber 14 acts in the direction shown by the arrow in chamber 14 which is the same direction as the pressure $Pv$ and the opposite direction to the pressure $Ps$.

A spring 15 bears at one end against stationary support 16 and at its opposite end against diaphragm D4 or valve rod VR. A spring 17 bears at one end against a stationary support 18 and at its opposite end against diaphragm D8 or valve rod VR1. Spring 15 therefore biases flapper F in the same direction as the set point $Ps$ and spring 17 biases flapper F1 in the opposite direction to the negative feedback pressure $Pn$. The force with which spring 15 biases flapper F and the force with which spring 17 biases flapper F1 may conveniently be of the order of 9 pounds per square inch.

The operation of the modification shown in Fig. 2 is as follows. Assume the pressure $Pv$ in chamber 3, which is the pressure proportional to the instantaneous value of the measured or process variable, to increase, since the diaphragm D2 is larger than diaphragm D1, the valve rod VR is moved down causing flapper F to approach the nozzle N and to increase the output pressure $P_o$ in pipe 9. The pressure $P_o$ passes through restriction $Rb$ to chamber 6 of the right controller section or stack R1. Since the diaphragm D6 is larger than the diaphragm D5, the valve rod VR1 is moved down. This causes the flapper F1 to move away from the nozzle N1 whereby the pressure in pipe 12 is decreased. The pressure in pipe 12 passes to chamber 8. Since the diaphragm D8 is larger than the diaphragm D7, the decrease in pressure in chamber 8 causes valve rod VR1 to move up, or opposite to the direction in which it was moved by the change in pressure in chamber 6. This causes flapper F1 to approach nozzle N1 and to restore the pressure in pipe 12 to that value at which it was before the change in pressure occurred.

The change in pressure in pipe 12 and in pipe 8 is also fed through pipe 13 to chamber 14 of the left controller stack or section L1. Since diaphragm D4 is larger than diaphragm D3, this decrease in pressure causes valve rod VR to move up and thereby move flapper F away from nozzle N, or in a direction opposite to that in which the flapper F is moved by the change in pressure $Pv$ in chamber 3. This upward movement of flapper F restores the output pressure $P_o$ in nozzle N and pipes 9 and 5 to the value at which it was before the change in process variable pressure $Pv$ occurred.

Fig. 3 shows a modification similar to Fig. 2 in which the two controller stacks or sections have been combined. The same members have been given the same reference characters. The upper portion of the casing contains the process variable chamber 3 and the set point chamber 4. Any difference between the pressure $Pv$ and the pressure $Ps$ causes the valve rod VR to move the flapper F relative to the nozzle N and thus vary the output pressure $P_o$ in pipe 5. Fluid passes to pipe 5 and nozzle N through supply restriction 2. The output pressure $P_o$ passes through restriction $Rb$ to the negative feedback chamber 6 having a capacity $Cn$ and through restriction $Ra$ to the positive feedback chamber $Pr$ having a capacity $Cr$. Any difference between the pressures $Pn$ and $Pr$ causes valve rod VR1 to move flapper F1 relative to nozzle N1 and thus vary the fluid from supply restriction 11. The variation in the fluid in nozzle N1 passes through pipe 12 to chamber 8 where it acts on valve rod VR1 in the opposite direction to negative feedback pressure $Pn$ and through pipe 13 to chamber 14 where it acts on valve rod VR in the opposite direction to pressure $Pv$.

Fig. 4 shows a modification in which but a single stack controller is employed. This controller consists of a casing, generally indicated at 20, formed of a plurality of rings. Each of diaphragms D10, D11, D12, D13, and D14 is connected at its circumference to the wall of the casing and each is connected at its central, movable portion to a valve rod VR3 which moves flapper F3 relative to nozzle N3 against the bias of spring S3. Chamber 21 is the positive feedback chamber adapted to receive a fluid pressure $Pr$ and having a capacity $Cr$. Chamber 22 is adapted to receive a manually adjustable pressure $Ps$ proportional to that value of the process or measured variable which it is desired to have the controller maintain. Chamber 23 is adapted to receive a fluid pressure $Pv$ proportional to the instantaneous value of the measured variable or that variable of the process to which it is desired to have the controller respond. Chamber 24 is adapted to receive a negative feedback pressure $Pn$ and has a capacity $Cn$.

Supply of compressed fluid from a filtered air supply F.A.S. passes through restriction 25 to nozzle N3 and to the motor chamber 26 of a pilot valve or relay, generally indicated at 27. Relay 27 is a high capacity, non-bleed pilot valve of well known type. An example is shown in U.S. Patent No. 2,303,891 of December 1, 1941 to C. B. Moore. Such a relay contains an output chamber 28 containing an inlet valve 29 and an exhaust valve 30 (the details of inlet valve 29 and of exhaust valve 30 are shown in Patent No. 2,303,891). An outlet pipe 31 leads the outlet or control pressure $P_o$ to another controller or to the fluid-operated motor of the final control element, such as a valve. Such a controller and such a motor-operated valve are well known and are therefore not shown herein.

Pipe 31 also connects to a manually adjustable restriction $Rb$, such as a needle valve. The opposite side of restriction $Rb$ is connected to a branched pipe 32, one branch of which leads to the motor chamber of a one-to-one, high capacity, isolation relay, generally indicated at 33. Relay 33 has a motor chamber 34 and an outlet chamber 35 having an exhaust valve 36 and an inlet connection containing a restriction 37 and leading to an inlet valve. Relay 36 may also be of the type shown in U.S. Patent No. 2,303,891 suitably proportioned to give a ratio of input pressure to output pressure of one to one. The exhaust valve 36 and the inlet valve connected to restriction 37 are not shown herein since they can be seen by reference to Patent No. 2,303,891.

The outlet chamber 35 is connected by means of manually adjustable restriction $Rc$, such as a needle valve, to the negative feedback chamber 24.

Another branch of pipe 32 leads to a manually operable restriction $Ra$, such as a needle valve. The opposite side of restriction $Ra$ is connected by pipe 38 to the positive feedback chamber 21.

Figure 5:
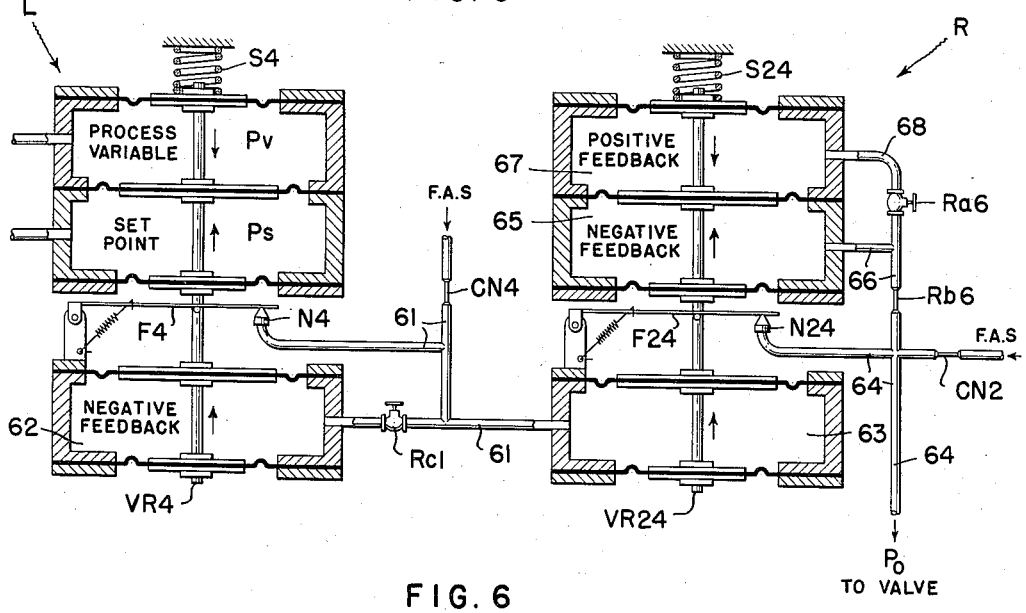

Fig. 5 shows a modification of the controller containing two stacks. In this modification, the set point pressure $Ps$ is fed to the set point chamber of the stack L at the left in Fig. 5 so as to oppose the pressure $Pv$ in the process variable chamber at the top of the stack L. A valve rod VR4 is stressed by a spring S4 against the pressure in the lower chamber 62 of the stack L. The flapper F4 governs the supply of air in the nozzle N4 supplied from the source F.A.S. through the restriction CN4 and fed through a pipe 61 and rate restriction Rc1 to the bottom chamber 62 of the left stack L. Pipe 61 also connects to the bottom chamber 63 of the right stack R of Fig. 5. The valve rod VR24 of the right stack operates a flapper F24 relative to the nozzle N24 so as to vary the pressure of the air supply from a source F.A.S. through a restriction CN2. Nozzle N24 governs the pressure in the pipe 64 which leads to the air-operated motor for the final control valve (not shown) and to a restriction $Rb6$. Pipe 66 leads from restriction $Rb6$ to a negative feedback chamber 65 and to restriction $Ra6$. Pipe 68 leads from restriction $Ra6$ to a positive feedback chamber 67. Valve rod VR24 is biased by a spring S24 against the pressure in chamber 63.

The operation of the modification of Fig. 5 is as follows. If a deviation occurs in the process variable pressure $Pv$ in the process variable chamber, flapper F4 is moved relative to nozzle N4 so as to vary the pressure in pipe 61. The pressure in pipe 61 is fed immediately to the chamber 63 and, after a delay due to the restriction Rc1, to the chamber 62. The pressure in chamber 62 opposes the change in the process variable pressure and gives a negative feedback to the valve rod VR4 so as to rebalance the flapper F4 at its original position. The pressure in chamber 63 causes flapper F24 to move relative to nozzle N24 and thus vary the pressure in pipe 64 which is transmitted to the final control element. The pressure in pipe 64 is also fed, after a delay caused by restriction $Rb6$, to the negative feedback chamber 65 where it causes flapper F24 to move toward its original position so as to eliminate the deviation.

The negative feedback pressure in chamber 65 and pipe 66 is also fed through restriction $Ra6$ and pipe 68 to the positive feedback chamber 67 which tends to move the flapper F24 in the same direction as the deviation. Suitable selection of the sizes and adjustments of restrictions $Ra6$ and $Rb6$ will thus adjust the proportional band and the reset rate of the controller to values suitable for the process under control.

Figure 6:
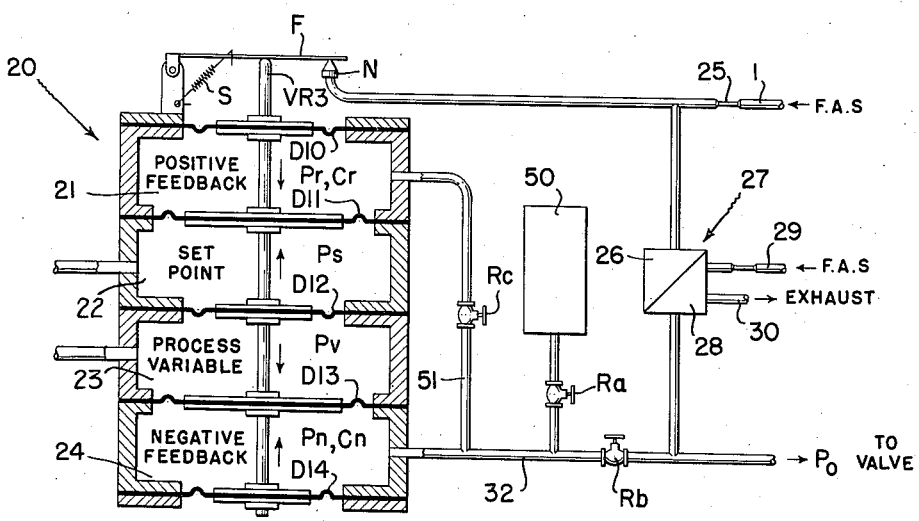

Fig. 6 shows a modification similar to Fig. 4 and to which the same reference characters have been employed. In the modification of Fig. 6, however, the one-to-one relay 33 has been omitted. Instead, the output of restriction $Rb$ is connected to negative feedback chamber 24 through pipe 32 to the input to restriction $Ra$ which provides for the adjustment of the proportional band of the controller. The output of restriction $Ra$ is fed to a chamber 50 having rigid walls defining a closed volume of suitable capacity. The capacity of chamber 50 may advantageously be ten times that of negative feedback chamber 24. Pipe 51 connects negative feedback chamber 24 to positive feedback chamber 21 through an adjustable restriction $Rc$ which provides means for adjusting the reset rate of the controller.

Fig. 7 shows a modified form of controller similar to that shown in Fig. 4 and to that shown in Fig. 6 and to which the same reference characters have been applied to equivalent elements. In the modification of Fig. 7, however, the output pressure $P_o$ in pipe 31 is applied to the input of a restriction $Rc$ whose output is connected to a chamber 71 having rigid walls defining a closed volume of suitable capacity. The output of restriction $Rc$ and of chamber 71 are connected to the input of restriction $Rb$ whose output, in turn, is connected to the negative feedback chamber 24. A pipe 72 connects the negative feedback chamber 24 to the input of restriction R*a* which is connected by pipe 73 to the positive feedback chamber 21. The circuit containing the resistance of restriction R*c* and the volume of chamber 71 is included in the input to the negative feedback chamber 74 but is ahead of the pressure divider circuit formed by the resistances of restrictions R*b* and R*a* and the volumes of chambers 24 and 21. This pressure divider circuit is used to obtain proportional band adjustment.

Fig. 8 shows a modification similar to that of Fig. 7 and to which the same reference characters have been applied. In the modification of Fig. 8, however, the output of restriction R*c* is fed to the input of a restriction R*d* whose output is connected to the chamber 81 having rigid walls defining a closed chamber of suitable volume. Connection R*b* is connected on its input side to the output of restriction R*c* and the input of restriction R*d*. On its output side, restriction R*b* is connected to negative feedback chamber 24.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In an air-operated controller, control-exercising means applying to an air pressure a deviation-pressure component proportional to the instantaneous deviation between the instantaneous value of the controlled variable and that value of the controlled variable which the controller is set to maintain, a first air-pressure-operated motor having operative connection with said control-exercising means and operative to move said control-exercising means in proportion to the instantaneous value of the controlled variable, a second air-pressure-operated motor having operative connection with said control-exercising means and operative to move said control-exercising means to reduce said deviation-pressure component, a first restriction connected in the input to said second motor and operative to modify the application of said deviation-pressure component to said second motor, a third air-pressure-operated motor having a direct mechanical connection with said control-exercising means and operative to move said control-exercising means to maintain said deviation-pressure component, a second restriction connected at one end to said first restriction and to said second motor and connected at its other end to said third motor and operative to modify the application of said deviation-pressure component to said third motor commencing at the same time as the application of said deviation-pressure component to said second motor, and means confining said air pressure to said second and to said third air-pressure-operated motors and to said restrictions, said air pressure being under the sole control of said control-exercising means.

2. A fluid-operated controller according to claim 1 in which one of said restrictions is adjustable.

3. A fluid-operated controller according to claim 1 in which both of said restrictions are adjustable.

4. A fluid-operated controller according to claim 1 in which said second restriction is adjustable.

5. An air-pressure-controlled instrument according to claim 1 having an air-operated relay which actuates the valve means to provide said pressure varied by said control-exercising means.

6. In fluid-pressure-control apparatus, a source of fluid under pressure, valve means for controlling the pressure of the fluid from said source by controlling the escape of fluid from said source to atmosphere, fluid-pressure-operated means directly mechanically connected to said valve means and responsive to a pressure directly applied thereto and representative of the deviation of a measured variable from a desired value and to a throttling range determining pressure, and means for varying said throttling range determining pressure, including, members forming parts of said fluid-pressure-operated means and each responsive in a sense opposite to the other to the controlled pressure for controlling the pressure of the fluid from said source, means adjustable to vary the rate of build up of the total pressure which the controlled pressure exerts on said members, means adjustable to vary that portion of said total pressure which the controlled pressure exerts on that one of said members which varies said throttling range pressure in the same sense as said deviation, and means confining fluid from said source to said fluid-pressure-operated means except for the fluid escaping through said valve means.

7. In fluid-pressure-control apparatus, valve means for establishing a controlling pressure from the fluid from a source by controlling the escape of fluid from said source to atmosphere, a fluid-pressure-operated motor having a direct mechanical connection with said valve means and responsive to a pressure directly applied thereto and representative of the deviation of a measured variable from a desired value and to a negative balancing pressure and to a positive balancing pressure, and means to vary said negative and positive balancing pressures in response to said deviation, including, an input connection to the negative-balancing-pressure-responsive portion of said motor for fluid flow responsive to said controlling pressure to conduct said negative balancing pressure to said motor, a restriction in said input connection, a second connection for fluid flow tending to equalize said negative and positive balancing pressures, and an adjustable restriction in said second connection, said connections and said restrictions confining the fluid from said source to said means to vary said negative and positive balancing measures except for the fluid escaping through said valve means.

8. In pressure fluid control apparatus, a source of fluid under pressure, a controller for establishing a controlling pressure of the fluid from said source and having means controlling the escape of fluid from said controller and responsive to a plurality of pressures including a pressure representative of the deviation of a measured variable from a desired value and a negative balancing pressure and a positive balancing pressure, and means to vary said negative and positive balancing pressures in response to said deviation, including, a first input connection to the negative-balancing-pressure-responsive portion of said controller for fluid flow responsive to said controlling pressure to conduct said negative balancing pressure to said controller, a restriction in said first input connection, a second connection for fluid flow tending to equalize said negative and positive balancing pressures, and an adjustable restriction in said second connection, said connections and said restrictions comprising a fluid-conducting means confining said fluid within said controller.

9. In pressure fluid control apparatus, a source of fluid under pressure, a controller for controlling the pressure of the fluid from said source and having means controlling the escape of fluid from said controller and responsive to a plurality of pressures including a pressure representative of the deviation of a measured variable from a desired value and a throttling range determining pressure, and means for varying said throttling range determining pressure, including, members each responsive in a sense opposite to the other to the controlled pressure for controlling the pressure of the fluid from said source, means adjustable to vary the rate of build up of the total pressure which the controlled pressure exerts on said members, and means adjustable to vary that portion of said total pressure which the controlled pressure exerts on that one of said members which varies said throttling range pressure in the same sense as said deviation, said members and said adjustable means comprising a fluid-conducting means confining said fluid within said controller.

10. In an elastic-fluid-pressure-operated controller, control-exercising means applying to an air pressure a deviation-component proportional to the instantaneous deviation between the instantaneous value of the controlled variable and that value of the controlled variable which the controller is set to maintain, a first restriction having an inlet connected to said pressure containing said deviation component, a second restriction having an inlet connected to the outlet of said first restriction, a negative-feedback motor having operative connection with said means and operative to move said means to reduce said deviation component, a connection between said negative-feedback-motor and the outlet of said second restriction, a third restriction having an inlet connected to the outlet of said second restriction and to said negative-feedback motor, a positive-feedback motor having operative connection with said means and operating to move said means to maintain said deviation component, said positive-feedback motor being connected to the outlet of said third restriction, a fourth restriction having an inlet connected to the outlet of said first restriction and to the inlet of said second restriction, and a chamber having rigid walls defining a capacity for fluid connected to the outlet of said fourth restriction.

11. A controller applying to an air pressure a deviation component proportional to the deviation of the value of the control variable from that value which the controller acts to maintain, a negative-feedback motor actuating said controller in a sense to reduce said deviation component, a positive-feedback motor actuating said controller in a sense to maintain said deviation component, a first conduit connected to said negative-feedback motor so as to apply fluid thereto, a first restriction in said conduit and controlling the flow of fluid therethrough, a second restriction in said conduit controlling the flow of fluid therethrough, a second conduit between said negative-feedback motor and said positive-feedback motor, a third restriction in said second conduit between said motors and controlling the flow of fluid therethrough, a fourth restriction having an inlet connected to said first conduit between said first restriction and said second restriction, and a hollow container of fixed size connected to the outlet of said fourth restriction.

12. A controller applying to an air pressure a deviation component proportional to the deviation of the value of the control variable from that value which the controller acts to maintain, including, a control-exercising devcie operable in either direction to vary an output fluid pressure by controlling the escape of fluid to atmosphere, a negative-feedback motor directly mechanically connected to said device and operating it in the direction to counteract the deviation, a first restriction having its inlet connected to said output fluid pressure and its outlet connected to said negative-feedback motor, a positive-feedback motor directly mechanically connected with said control-exercising device to operate said device in the direction to maintain the deviation, a conduit connecting said motors, and a second restriction connected in said conduit and controlling the flow of fluid therethrough, said motors and said restrictions and said conduit providing means for conducting said fluid and preventing its escape to atmosphere except through said control-exercising device.

References Cited in the file of this patent

UNITED STATES PATENTS

| | | |
|---|---|---|
| 2,512,561 | Ziegler | June 20, 1950 |
| 2,517,051 | Swenson | Aug. 1, 1950 |
| 2,543,120 | McLeod | Feb. 27, 1951 |
| 2,633,858 | Eckman | Apr. 7, 1953 |
| 2,638,911 | Griswold | May 19, 1953 |
| 2,712,321 | Grogan | July 5, 1955 |
| 2,737,964 | Olah | Mar. 13, 1956 |
| 2,776,670 | Hunt | Jan. 8, 1957 |